Nov. 29, 1966     C. R. HALL ETAL     3,288,822
BROMINATED FATTY ACID AMIDES
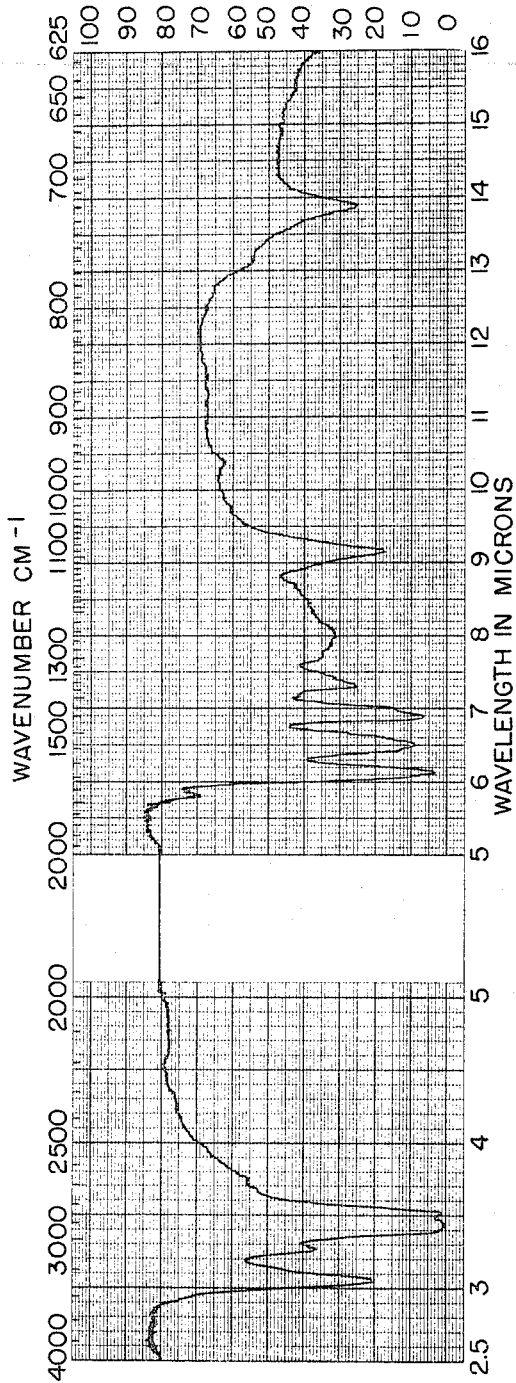
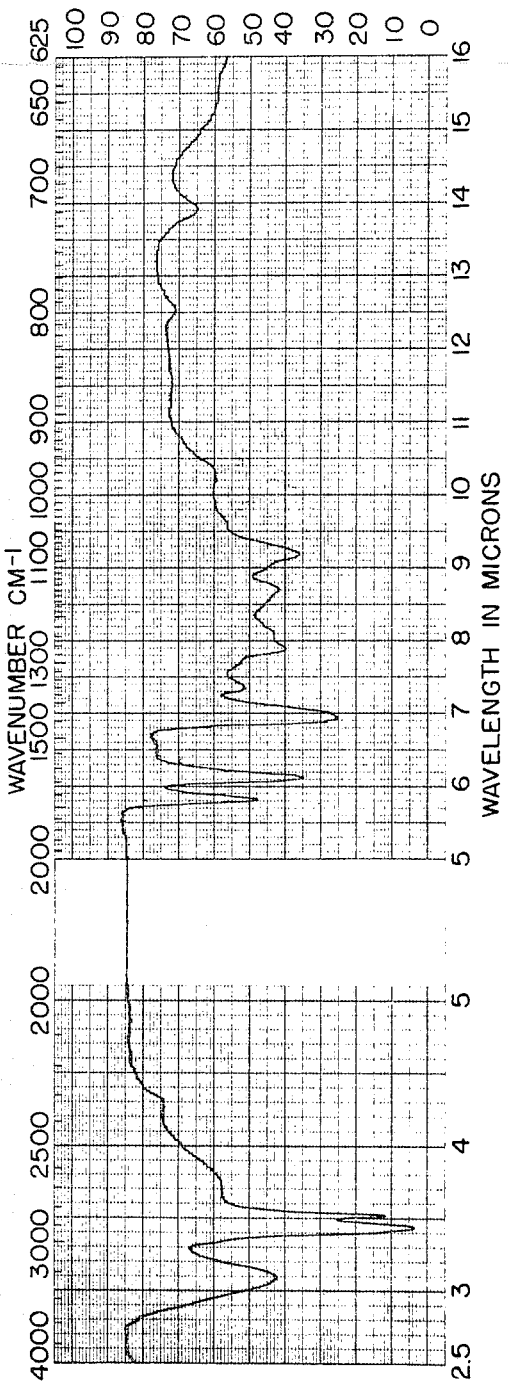

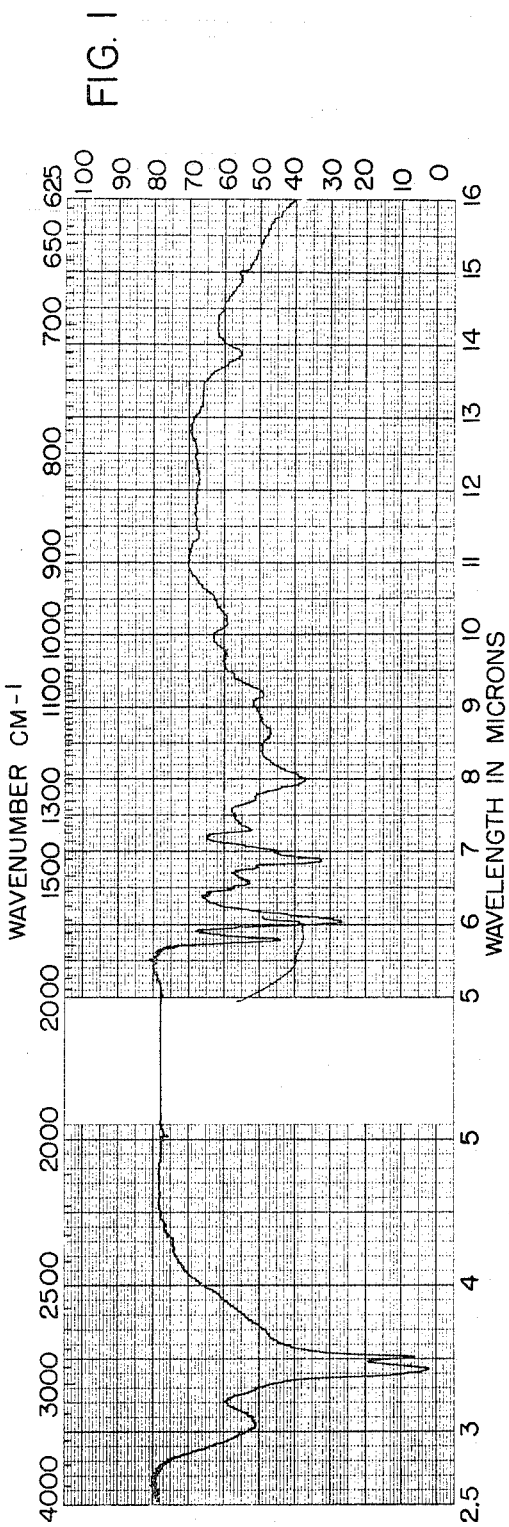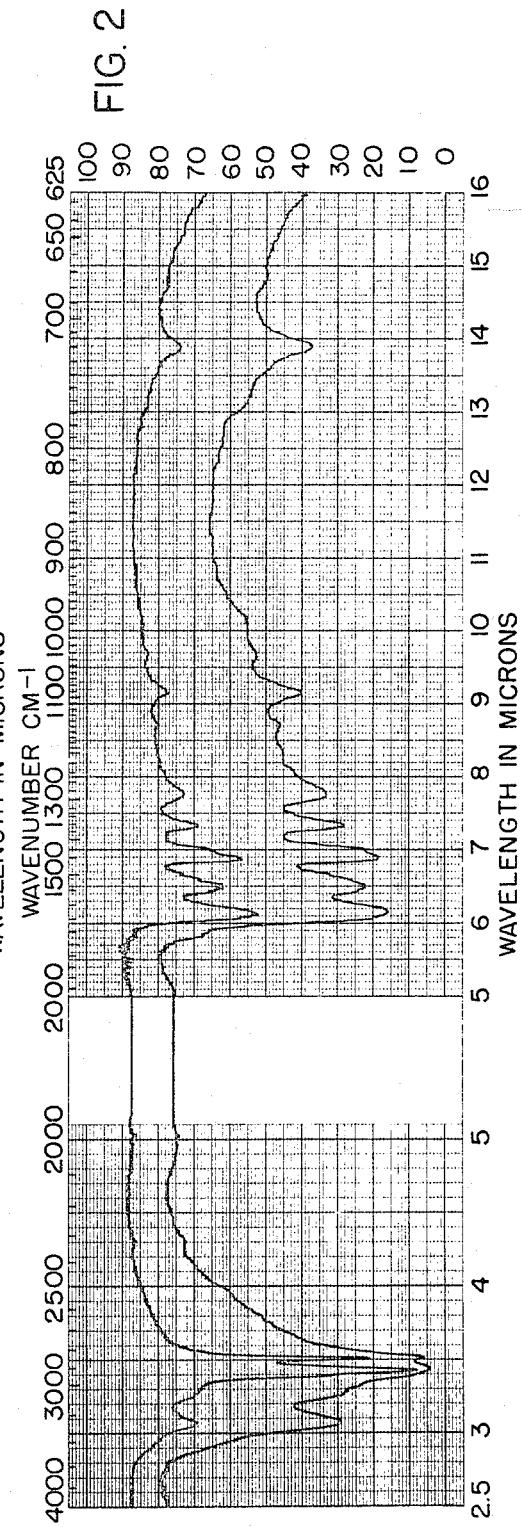

3,288,822
BROMINATED FATTY ACID AMIDES
Charles R. Hall, Akron, Ohio, and Joseph E. Stonis, Palos Park, Ill., assignors to The C. P. Hall Company of Illinois, Chicago, Ill., a corporation of Ohio
Filed June 7, 1963, Ser. No. 286,223
14 Claims. (Cl. 260—404)

This invention relates to fatty acid amides in which the nitrogen is mono- or disubstituted, which amides contain bromine in the nitrogen-substituent portion and which may or may not contain bromine in the fatty chain also. The amino group is mono- or disubstituted by a fatty chain or mixture of fatty chains, and at least one substituent is from an unsaturated fatty acid and is brominated. If the amino group is disubstituted the substituents may be different—one may be substituted with the other unsubstituted, as when the amino group is from an amine formed from a naturally occurring fatty acid composition.

*Definitions:* In the specification and claims, "fatty chain" is used to refer to a chain such as is attached to the carboxyl group of a fatty acid, and "fatty amino group" is used to refer to an amino nitrogen group containing one or two fatty chains.

The bromine is introduced by addition so that there is an even number of at least two bromine atoms in each molecule and the number of bromine atoms in any molecule may total as many as 6 or 10 or more.

Thus, the formula may be written

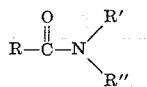

in which R is (1) a fatty chain or (2) a fatty chain containing an even number of bromine atoms per molecule, and —NR'R" is a brominated mono- or disubstituted amino group in which there are an even number of bromine atoms.

The brominated amides of this invention are chiefly valuable as flame retardants for use in plastics. Flame retardants should have a bromine content such that when added to a combustible material there is 3 to 15 percent or more of bromine present, based on the weight of the combustible material. They should have at least a boiling point of 250° C. or even 275° C. or 300° C. or more at atmospheric pressure. There are two considerations important in connection with this use. First, the mechanism of the burning process. The large size of the bromine molecule accomplishes the most important function necessary to retard combustion; that is, the absorption of heat energy. It absorbs the heat necessary to propagate combustion. The second consideration is the physical barrier of the bromine to oxygen penetration. Chlorine does not possess this property to anywhere near the extent that bromine does.

It is important that the amide include at least one N-subsituent. This contributes compatibility to the compound so that the compound is compatible with a wide variety of thermoplastic organic polymers, etc. It makes the amides unusually substantive to polar-type polymers, thus decreasing their extractability. The amides are stable to heat and light under a wide variety of conditions. They are also stable to hydrolysis and moisture and are resistant to mold and fungi.

In order to obtain one or more of the foregoing beneficial results to the utmost degree, it is often desirable to utilize an N,N-disubstituted amide. On the other hand, the molar bromine content of an amide is lowered by utilizing a disubstituted amide rather than a mono-substituted amide.

The flame retardants can be added to cellulosic plastics, polyethylene, nylon, polyesters, rubber and other elastomers, films, coatings, spun fibers, plastic moldings, castings, adhesives, and may be ued in the impregnation of wood, paper, cotton cloth, etc. A bromine content of at least about 25 or 30 percent or more is generally required in a flame retardant. It may be incorporated directly in the plastic prior to spinning or other fabrication. The brominated amides are also useful as pigment deflocculants in paints, gasoline additives, lubricant additives, insecticides, as insect repellants, pesticides, pest repellants, moldicides, fungicides, drug additives (as for example in the treatment of skin and hair conditions), cosmetics (as for example in the treatment of acne and other skin disorders), etc. They are synergists and solvents for drugs, insecticides and insect repellants (as for example to increase the potency of DDT, Sevin, N,N-diethyl toluamide, etc. They facilitate the removal of gasses in molten metal processing, and are useful as deemulsifiers, as fire-resistant hydraulic fluids and other heat-transfer media, anti-blocking agents, mold releases, slimicides, anti-static agents, solubilizers for dyes, antioxidants, antiozonants, and as cutting and drawing compounds. They are useful for the treatment of woods and seeds, and in the treatment of drilling muds, etc.

Their valuable properties include their polarity and outstanding compatibility with organic systems, their freedom from odor, their low vapor pressure, and the fact that the bromine is present in a form that is generally non-corrosive. Most of the brominated amides are liquid, and this facilitates their incorporation in plastics, etc.

The bromination is effected by brominating carbon-carbon double bonds of ethylenically unsaturated chains at least one of which double bonds is in the N-substituent portion of the molecule (R' or R"). Bromination adds two bromines at one or more of the double bonds, whether these be only in the N-substituent portion or whether some bromine adds to the fatty acid chain also. Bromination is effected by mixture of bromine with the amide in liquid form or in solution where necessary, and catalysts of such addition bromination may be employed but are not necessary. During the bromination it is desirable to employ a low temperature to prevent substitution with release of hydrogen bromide.

The compounds which can be brominated vary appreciably in chain length and in unsaturation, and thus the molecular weight and other properties dependent upon chain length can be varied over a wide range, as well as bromine content. Compounds containing 25 percent or more of bromine are particularly valuable as flame retardants.

A flame retardant in which the fatty chain (R) is small, as for example, where it is acetyl, butyl or hexyl, is often preferred because of the higher percentage of bromine present in the finished amide. If a longer chain fatty acid is used it is preferably unsaturated and brominated concurrently with the substituent group or groups. A short chain substituent group or groups is desirable, such as allyl, and when the substituent group or groups are allyl, a longer chain fatty acid may be employed in order to produce a less volatile and more permanent product. Because the fatty acids containing 18 and more carbon atoms are particularly abundant in nature, they are preferred in the fatty chain (R) when the substituent (R' and R") or substituents are allyl groups, and when one or two longer chain substituents (R' and R") are desired they are preferably obtained from an unsaturated fatty amine which contains 18 or more carbon atoms, and the fatty chain of the amide is then preferably derived from acetic or an unsaturated, naturally occurring fatty acid of 18 or more carbon atoms which is brominated concurrently with bromination of the substituent portion of the molecule.

In the production of flame retardants it is not necessary to carry the bromination of the fatty amides to completion, and then molecules containing an N-substitution of bromine content are mixed with molecules containing an unbrominated N-substitution, or they may be mixed with amides containing cheaper chlorinated substituents. The brominated fatty amides may be mixed with amides containing no bromine obtained from saturated fatty acid with which unsaturated fatty acid is found in nature.

The amides of the subject invention have one or two N-substituents (R′ or R″) of which the following are illustrative, the number of carbon atoms in each being indicated:

9,10-dibromostearyl (18 carbon atoms)
12,13-dibromo, 9,10-oleyl (18 carbon atoms)
9,10,12,13-tetrabromostearyl (18 carbon atoms)
9,10-dibromo, 12-hydroxystearyl (18 carbon atoms)
12,13,15,16-tetrabromooleyl (18 carbon atoms)
9,10,12,13,15,16-hexabromostearyl (18 carbon atoms)
15,16-dibromo, 9,10,12,13-linoleyl (18 carbon atoms)
9,10-dibromo arachidyl (20 carbon atoms)
13,14-dibromo, behenyl (22 carbon atoms)
dibromo, tetrabromo and hexabromo derivatives of elaeostearyl (18 carbon atoms)
dibromo, etc. derivatives from 5,6,8,9,11,12,14,15-eicosatetraenyl (20 carbon atoms)
dibromo, etc. derivatives of clupanodonyl (22 carbon atoms)
dibromo, etc. derivatives of licanyl (18 carbon atoms)

Also, the N-substituent may comprise one or two 2,3-dibromopropyl radicals derived from an amide formed from an allyl amine.

The acids from which the foregoing brominated amides are obtainable and the number of carbon atoms in each, are:

Oleic, linoleic and linolenic acids (18 carbon atoms) from many fats and oils
Ricinoleic acid (18 carbon atoms) from castor oil
Erucic acid (22 carbon atoms) from rapeseed oil
Elaeostearic acid (18 carbon atoms) from tung oil
Arachidonic acid (20 carbon atoms) clupanodonic acid (22 carbon atoms) from fish fats and oils
Licanic acid (22 carbon atoms) from oiticica oil Such amides include, for example, the N-dibromostearyl and N,N-di(dibromostearyl) amides from formic acid, acetic acid, propionic acid, butyric acid, valeric acid, caproic acid, heptanoic acid, caprylic acid, pelargonic acid, capric acid, lauric acid, myristic acid, palmitic acid, stearic acid, etc. amides, as well as amides of brominated acids obtained by addition bromination effected simultaneously with bromination of the one or two nitrogen-substituents, such as dibromolauric acid, dibromomyristic acid, dibromopalmitic acid, dibromostearic acid, tetrabromostearic acid, etc.

Usually there will be two substituents on the nitrogen because a single substituent leaves an active hydrogen. The amide used for the bromination contains at least one unsaturated N-substituent which is brominated (or the substituent may be brominated before incorporation in the amide), and the other N-substituent, if any, may be saturated or unsaturated before the bromination reaction.

The invention is further illustrated by the following examples:

EXAMPLE I

This example refers to the preparation of N-2,3-dibromopropyl 9,10-dibromo stearamide which is first obtained in admixture with other brominated amides. The starting material is a technical methyl oleate having the following composition:

| | Percent |
|---|---|
| Methyl myristate | 3.7 |
| Methyl myristoleate | 1.8 |
| Methyl palmitate | 5.2 |
| Methyl palmitoleate | 6.6 |
| Methyl stearate | 0.3 |
| Methyl oleate | 75.8 |
| Methyl linoleate | 5.6 |

Five thousand nine hundred seventy-five pounds of this mixture of methyl esters having an iodine number of 88, a saponification number of 191, and an acid number of less than 2.0 mgs. of KOH per gram, was charged to a 1000-gallon reaction vessel. The contents of the vessel was heated to 120° C. under a vacuum and agitated to remove the water. After cooling to 40° C., 141 pounds of 25-percent sodium methylate solution in methanol was added and then the addition of 1265 pounds of liquid allyl amine was begun. The addition of amine caused the temperature to rise to about 50 to 60° C. over a period of 8 hours. Agitation was continued for another 8 hours and then the sodium methylate was neutralized with dilute sulfuric acid and the unreacted methanol and excess amine evaporated. The remaining liquid was then filtered and distilled in a molecular still to obtain the N-allyl amide of the mixed acids.

One hundred grams of the amide prepared as above was placed in a 3-neck flask provided with a stirrer, a thermometer and an inlet funnel through which bromine was added. Three ml. of methanol was added and mixed with the amide. The flask was cooled to minus 10° C. in a Dry Ice-isopropanol bath. The bromine was then added while maintaining the temperature between plus 10° C. and minus 10° C. until the orange-reddish color due to uncombined bromine persisted. A large amount of heat was evolved in the reaction, and good agitation was employed to dissipate the heat and keep the reaction mixture from forming color bodies. The methanol present suppresses the formation of color bodies and free fatty acids, and aids in maintaining a good color. Other alcohols might be used. The product was then washed with water and then with 5 percent sodium carbonate solution until neutral to phenolphthalein. Chloroform may be added for separation of the water from the bromo derivative. Other alkaline solutions may be used such as sodium hydroxide, sodium bicarbonate, ammonium hydroxide etc.

On purification the product contained 45.84 percent bromine with a specific gravity of 1.4256 at 60° C. referred to water at 60° C. and 1.4243 at 70° C./70° C. The infra-red spectrum is shown in FIGURE 1.

To obtain more complete halogenation, the foregoing bromo amide can be chlorinated until saturation of the double bonds in the various molecules of which the composition is composed is substantially complete.

EXAMPLE II

N-9,10-dibromostearylacetamide

This example is given to show how the brominated compound can be made when the acyl group is derived from a short chain acid such as acetic. The other examples show how they can be derived from a long chain aliphatic acid.

The starting amide for this reaction is made by acetylation with acetyl chloride or oleylamine. The oleyl amine is a technical grade derived from a commercial oleic acid containing approximately 75 percent oleic acid. It is usually produced by dehydration of the commercial unsubstituted amide to form the nitrile, which is then reduced to the amine, thus, $$RCOOH + NH_3 = RCONH_2 + H_2O$$
$$RCONH_2 - H_2O = RCN + H_2O$$
$$RCN + 2H_2 = RCH_2NH_2$$

One hundred grams N-oleylacetamide was dissolved in 100 grams of ethyl alcohol and mixture cooled to −5°

C. Agitation was begun and then bromine was added drop by drop until 50 grams were added to the solution. The appearance and maintenance of a reddish-orange color showed an excess of bromine was present. This was agitated another 30 minutes while the temperature was allowed to climb to 10° C. Then the mixture was taken up in 1,1,1-trichlorethylene and washed with warm water, then with 5 percent Na₂CO₃, then with water until the washings were neutral to litmus paper. The product was stripped of chloroform and other remaining volatiles and the viscous liquid product was analyzed:

Bromine, percent _____ 31.96
Sp. gravity at 70° C./70° C. _____ 1.1969

Infra-red spectra obtained from thick and thin films are shown in FIGURE 2.

EXAMPLE III

*N-9,10-dibromostearyl-9,10-dibromostearamide*

This is an example of a bromo amide in which both the acyl chain and the N-substituent are derived from a long-chain unsaturated fatty acid. The compound is:

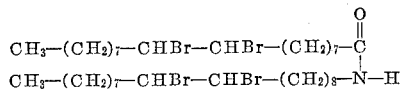

To make this, 44 grams of N-oleyl-oleamide was dissolved in 150 ml. of isopropyl alcohol and the solution cooled to 0° C. Twenty-six grams bromine dissolved in 100 ml. of CHCl₃ was added drop by drop while the solution was agitated vigorously. The solution was slightly orange at the end of the reaction. It was then washed with warm water and 5 percent ammonia solution. The subsequent washings to remove base were uncomplicated. The liquid product was stripped to remove isopropyl alcohol, water, and chloroform and then analyzed.

Bromine, percent _____ 26.54
Sp. G. at 70° C./70° C. _____ 1.1234

The infra-red spectrum is shown in FIGURE 3.

EXAMPLE IV

*N,N-di-(2,3-dibromopropyl) 9,10-dibromostearamide*

This example is given to show how a compound could have bromine added to each substituent in the amide. Thus, R, R′, and R″ each have an alkylene group to which bromine may be added.

The N,N-diallyl-oleamide can be made by the usual methods. In this instance it was made by the reaction of 1 mole of oleoyl chloride with 2 moles of diallyl amine. This product was dissolved in methanol and brominated by the method given in Example I. The product obtained was a viscous liquid which remained liquid despite its high bromine content, in contrast to other hexabromostearamides. Although it too has six atoms of bromine in the molecules it remains a liquid whereas a hexabromide such as N,N-dimethyl hexabromostearamide is a solid. It is more easily incorporated in plastic than other bromides of similar nature and it is more compatible because of its low melting point. Its analysis shows:

Bromine, percent _____ 45.10
Sp. G. at 70° C./70° C. _____ 1.4975

The infra-red spectrum is shown in FIGURE 4.

It is often important to have the substituents small in order to not dilute the effect of the amide group. Amide substitution is important as it increases the ability of the molecule to dissolve or be dissolved by a substance.

Generally, the disubstituted amide is more compatible than the mono-substituted one. Also, generally, the disubstituted amides have lower melting points or can be liquids as compared to the mono-substituted amides, brominated or not in the acidic part of the chain or in the N-substitution.

Commercially, the use of pure compounds in the preparation of the amides will not be as appealing as the use of mixtures. The mixtures will be derived from naturally occurring fatty acid mixtures which usually will include saturated acids. These fatty chains will add no bromine during the bromine addition procedure, so the unsaturation of the N-substitution and the extent to which the double bonds are brominated will determine the desired average bromine content which in flame retardants, for example, will be some 25 or 30 weight percent or more. Thus, the desired bromine content may be obtained by having a more highly brominated compound present with a dibrominated or unbrominated amide. By bromination of allyl substituents, for example, a high bromine content is readily obtained by adding four bromines to obtain di-(dibromopropyl) stearamide or the like. Thus bromination by addition to the amide substituents provides an easy means for obtaining mixed amides of a desired bromine content which includes some unbrominated amide.

The invention is covered in the claims which follow.

What I claim is:

1. An amide having the formula

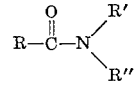

in which R is selected from the class consisting of (1) saturated fatty chains containing 1 to 21 carbon atoms and (2) fatty chains of 3 to 21 carbon atoms substituted by an even number of bromine atoms and derived from an initially ethylenically unsaturated fatty chain, and —NR′R″ is a brominated fatty amino group in which R′ is a fatty chain of 3 to 21 carbon atoms and contains an even number of bromines in which R″ may be such a fatty chain or hydrogen.

2. The compound of claim 1 in which R is methyl.
3. The compound of claim 1 in which R contains 17 carbon atoms.
4. The compound of claim 1 in which R is a saturated fatty chain.
5. The compound of claim 1 in which R is a brominated, naturally occurring fatty chain which contains an even number of bromine atoms.
6. The compound of claim 1 in which R′ is hydrogen.
7. The compound of claim 1 in which R″ is a brominated, naturally occurring fatty chain which contains an even number of bromine atoms.
8. The compound of claim 1 in which both R′ and R″ contain 18 carbon atoms.
9. The compound of claim 1 in which —NR′R″ includes a 2,3-dibromopropyl group.
10. A brominated amide composition with a boiling point of at least 250° C. at atmospheric pressure, which composition contains at least 25 percent bromine and is composed essentially of an amide having the formula given in claim 1 in which at least one of the groups R′ and R″ contains 18 carbon atoms brominated with an even number of bromine atoms.
11. N-2,3-dibromopropyl 9,10-dibromostearamide.
12. N-9,10-dibromostearyl acetamide.
13. N-9,10-dibromostearyl 9,10-dibromostearamide.
14. N,N-di(2,3-dibromopropyl) 9,10-dibromostearamide.

No references cited.

CHARLES B. PARKER, *Primary Examiner.*

JOSEPH P. BRUST, *Examiner.*

A. H. SUTTO, *Assistant Examiner.*